US008423497B2

(12) United States Patent
Lee et al.

(10) Patent No.: US 8,423,497 B2
(45) Date of Patent: Apr. 16, 2013

(54) SYSTEM AND METHOD FOR HYBRID RETE REASONING BASED ON IN-MEMORY AND DBMS

(75) Inventors: Seung Woo Lee, Daejeon (KR); Pyung Kim, Daejeon (KR); Jae Han Kim, Seoul (KR); Han Min Jung, Daejeon (KR); Mi Kyoung Lee, Daejeon (KR); Dong In Park, Seoul (KR); Won Kyung Sung, Daejeon (KR); Sun Hwa Hahn, Daejeon (KR)

(73) Assignee: Korea Institute of Science and Technology Information, Daejeon (KR)

( * ) Notice: Subject to any disclaimer, the term of this patent is extended or adjusted under 35 U.S.C. 154(b) by 0 days.

(21) Appl. No.: 13/133,447

(22) PCT Filed: Dec. 15, 2008

(86) PCT No.: PCT/KR2008/007422
§ 371 (c)(1),
(2), (4) Date: Jun. 8, 2011

(87) PCT Pub. No.: WO2010/071243
PCT Pub. Date: Jun. 24, 2010

(65) Prior Publication Data
US 2011/0246407 A1 Oct. 6, 2011

(30) Foreign Application Priority Data
Dec. 15, 2008 (KR) .................. 10-2008-0127509

(51) Int. Cl.
*G06F 17/00* (2006.01)
*G06N 5/00* (2006.01)
*G06N 5/02* (2006.01)

(52) U.S. Cl.
USPC ................................. 706/47; 706/45; 706/46

(58) Field of Classification Search ............... 706/45–47
See application file for complete search history.

(56) References Cited

U.S. PATENT DOCUMENTS
5,276,776 A * 1/1994 Grady et al. ................... 706/48

FOREIGN PATENT DOCUMENTS
| KR | 10-2005-0064347 A | 6/2005 |
| KR | 10-2007-0114604 A | 12/2007 |
| KR | 10-2008-0019439 A | 3/2008 |

OTHER PUBLICATIONS

R. Doorenbos, "Production Matching for Large Learning Systems", PhD Thesis, Carnegie Mellon University, Computer Science Department, Jan. 31, 1995, pp. 1-194.*
Eun-Seok Seo et al., "Efficient Combination of OWL-DL and SWRL for Maintaining Decidability", Proceedings of the Korean Information Science Society Conference, pp. 372-377, Oct. 2006.
International Search Report for International Application No. PCT/KR2008/007422.

(Continued)

*Primary Examiner* — Kakali Chaki
*Assistant Examiner* — Vincent Gonzales
(74) *Attorney, Agent, or Firm* — Park, Kim & Suh, LLC (57) ABSTRACT

A system and method for hybrid Rete reasoning based on memory and DBMS are provided. The system for hybrid Rete reasoning based on memory and DBMS includes a reasoning rule type classification means for classifying an input reasoning rule as one of one or more types. A network generation means generates a network depending on the classified reasoning rule type. A network execution means derives extended triples by applying a predetermined triple to the generated network.

30 Claims, 4 Drawing Sheets

OTHER PUBLICATIONS

Sellis, T. et al.: "Performance of DBMS implementations of production systems", Proceedings of The International Conference on Tools for Artifical Intelligence. Herndon, Nov. 6-9, 1990; Los Alamitos, CA: IEEE, Computer Soc, US, vol. CONF. 2, Nov. 6, 1990, pp. 393-399, XP010021163.

Chun Jin et al: "ARGUS : Rete + DBMS = Efficient continuous Profile Matching on Large-Volume Data Streams", In Proc. of the 15th International Symposium on Methodologies for Intelligent Systems, Dec. 31, 2004, pp. 1-42, XP55032400.

Tugba Ozacar et al: "Optimizing a Rete-Based Inference Engine using a Hybrid Heuristic and Pyramid based Indexed on Ontological Date", Journal of computers, Dec. 31, 2007, pp. 41-48, XP55032395.

European Search Report in Appln. No. 08878941.7 dated Jul. 20, 2012, 7 pages.

* cited by examiner

Fig. 6

α-MEMORY3

```
CREATE VIEW alphamem3 AS
SELECT T.subject AS s, 'ex:father' AS p, T.object AS o
FROM [ex:father] AS T
```

α-MEMORY4

```
CREATE VIEW alphamem4 AS
SELECT T.subject AS s, 'ex:brother' AS p, T.object AS o
FROM [ex:brother] AS T
```

Fig. 7

β-MEMORY3

```
CREATE VIEW betaamem3 AS
SELECT L.s AS c1, L.p AS c2, L.o AS c3, R.s AS c4 R.p AS c5, R.o AS c6
FROM alphamem3 AS LINNER JOIN alphamem4 AS R ON L.o=R.s
```

Fig. 8

| TRIPLE TYPE | CLASSIFICATION CONDITION | | EXAMPLE OF TRIPLE TABLE GENERATION | |
|---|---|---|---|---|
| RESOURCS TRIPLE TYPE | WHEN PREDICATE IS rdf:type | | <ex:Person, rdf:type, owl:Class> | owl:Class <br> subject: ex:Person |
| | | | <ex:p11, rdf:type, ex:Person> | ex:Person <br> subject <br> ex:p11 |
| OBJECT PROPERTY TRIPLE TABLE GENERATION | WHEN PREDICATE IS NOT rdf:type | WHEN PREDICATE HAS OBJECT PROPERTY | <ex:father, rdfs:domain, ex:Person> | rdfs:domain <br> subject / object <br> ex:father / ex:Person |
| | | | ... | ... |
| DATA TYPE PROPERTY TRIPLE TYPE | | | <ex:p11, ex:father, ex:p10> | ex:father <br> subject / object <br> ex:p11 / ex:p10 <br> ex:p12 / ex:p10 |
| | | | ... | ... |
| | | WHEN PREDICATE HAS DATA TYPE PROPERTY | <ex:p11, ex:name, "HONGGILDONG" ^^xsd:string> | ex:name <br> subject / label / language / datatype <br> ex:p11 / HONGGILDONG / null / xsd:string |

Fig. 9

SYSTEM AND METHOD FOR HYBRID RETE REASONING BASED ON IN-MEMORY AND DBMS

CROSS REFERENCE TO RELATED APPLICATION

This application is a National Stage of International Application No. PCT/KR2008/007422 filed Dec. 15, 2008, claiming priority based on Korean Patent Application No. 10-2008-0127509 filed Dec. 15, 2008, the content of which is incorporated herein by reference in its entirety.

TECHNICAL FIELD

The present invention relates, in general, to a hybrid Rete reasoning system and method for performing efficient reasoning on large-capacity Resource Description Framework (RDF) triples in an ontology reasoning system. More particularly, the present invention relates to a system and method for hybrid Rete reasoning based on memory and Database Management System (DBMS), which allow a memory reasoning method and a DBMS reasoning method to be selectively applied depending on the types of reasoning rules at the time of performing reasoning on RDF triples, thus enabling efficient reasoning to be performed on large-capacity RDF triples.

BACKGROUND ART

Typically, ontology reasoning is a process for deriving implicit knowledge from explicitly given ontology knowledge. Further, ontology knowledge in a semantic web is represented by languages, such as Resource Description Framework (RDF), an RDF Schema (RDFS), and Web Ontology Language (OWL). Since ontology technology is a set of RDF triples, rule-based reasoning is a process for deriving a new triple by applying given rules to a set of explicitly given RDF triples.

Recently, as semantic web technology has become widely propagated, various institutions generate ontology knowledge, and thus the scale of ontology knowledge gradually increases. Accordingly, a large-scale ontology reasoning system (hereinafter referred to as a 'reasoning system') capable of efficiently storing and reasoning large-capacity RDF triples (hereinafter referred to as 'triples') is urgently required.

As a result, in the prior art, a 'reasoning method using a Rete algorithm' (hereinafter referred to as a 'memory reasoning method') was proposed. This reduces a repeated pattern matching process by efficiently performing pattern matching, but there is a problem in that excessive memory is required. That is, in a reasoning system requiring the processing of more than several billions of triples, both α-memory and β-memory, which are data generated during a procedure for applying reasoning rules to the triples, must have been stored in physical memory (for example, Random Access Memory [RAM]), and thus there is the problematic requirement for large-capacity memory.

A 'reasoning method using a Database Management System (DBMS) (hereinafter referred to as a 'DBMS reasoning method'), which has been proposed in the prior art to solve such a problem, is suitable for the storage of large-capacity triples, but the problem of inefficiency in that DB tables must be repeatedly read and written during a reasoning process is presented.

DISCLOSURE

Technical Problem

Accordingly, the present invention has been made keeping in mind the above problems occurring in the prior art, and an object of the present invention is to provide a system and method for hybrid Rete reasoning based on memory and DBMS, which can perform efficient reasoning on large-capacity triples.

Technical Solution

In order to accomplish the above object, a system for hybrid Rete reasoning based on memory and Database Management System (DBMS) according to a first embodiment of the present invention comprises reasoning rule type classification means for classifying an input reasoning rule as one of one or more types; network generation means for generating a network depending on the classified reasoning rule type; and network execution means for deriving extended triples by applying a predetermined triple to the generated network.

The reasoning rule type classification means may classify the input reasoning rule as a structure-based reasoning rule type when a predicate of a condition part of the input reasoning rule has a structure property, and the network execution means may be configured such that an operation of deriving the extended triples conforms to a memory reasoning method when the reasoning rule is classified as the structure-based reasoning rule type.

The memory reasoning method may be configured to store data, generated during the operation of deriving the extended triples, in physical memory.

The network execution means may be configured such that, when the reasoning rule is (?x, ?a, ?y), the operation of deriving the extended triples conforms to the memory reasoning method.

The reasoning rule type classification means may classify the input reasoning rule as a case-based reasoning rule type when a predicate of a condition part of the input reasoning rule has a case property, and the network execution means may be configured such that the operation of deriving the extended triples conforms to a DBMS reasoning method when the reasoning rule is classified as the case-based reasoning rule type.

The DBMS reasoning method may be configured to define data, generated during the operation of deriving the extended triples, as an α-memory view and a β-memory view and store the data in virtual memory.

The reasoning rule type classification means may classify the input reasoning rule as a structure-based reasoning rule type if all predicates of two or more pairs of conditions have structure properties when the two or more pairs of conditions are present in a condition part of the input reasoning rule, and the network execution means may be configured such that the operation of deriving the extended triples conforms to a memory reasoning method when the reasoning rule is classified as the structure-based reasoning rule type.

The reasoning rule type classification means may classify the input reasoning rule as a case-based reasoning rule type if at least one predicate of two or more pairs of conditions has a case property when the two or more pairs of conditions are present in a condition part of the input reasoning rule, and the network execution means may be configured such that the operation of deriving the extended triples conforms to a DBMS reasoning method when the reasoning rule is classified as the case-based reasoning rule type.

The system may further comprise triple type classification means for classifying an input triple as one of one or more types; triple table generation means for generating a table depending on the classified triple type; and triple storage means for storing the classified triple in conjunction with the generated table.

The triple type classification means may classify the input triple as a resource triple type when a predicate of the input triple is rdf:type, and the triple table generation means may generate a table which has an object of the triple as a table name and has a 'subject' column, wherein a subject of the triple is allocated to a value of the table.

The triple type classification means may classify the input triple as an 'object property triple type' when a predicate of the input triple has an object property other than rdf:type, and the triple table generation means may generate a table which has the predicate of the triple as a table name and has 'subject' and 'object' columns.

The triple type classification means may classify the input triple as a data type property triple type when a predicate of the input triple has a data type property other than rdf:type, and the triple table generation means may generate a table which has the predicate of the triple as a table name and has 'subject', 'label', 'language' and 'datatype' columns, wherein only one of the 'language' and 'datatype' columns has a value and a remaining one is null.

Further, a method for hybrid Rete reasoning based on memory and Database Management System (DBMS) according to a first embodiment of the present invention comprises a reasoning rule type classification step of classifying an input reasoning rule as one of one or more types; a network generation step of generating a network depending on the classified reasoning rule type; and a network execution step of deriving extended triples by applying a predetermined triple to the generated network.

The reasoning rule type classification step may be performed to classify the input reasoning rule as a structure-based reasoning rule type when a predicate of a condition part of the input reasoning rule has a structure property, and the network execution step may be configured such that an operation of deriving the extended triples conforms to a memory reasoning method when the reasoning rule is classified as the structure-based reasoning rule type.

The memory reasoning method may be performed to store data generated during the operation of deriving the extended triples in physical memory.

The network execution step may be performed such that, when the reasoning rule is (?x, ?a, ?y), the operation of deriving the extended triples conforms to the memory reasoning method.

The reasoning rule type classification step may be performed to classify the input reasoning rule as a case-based reasoning rule type when a predicate of a condition part of the input reasoning rule has a case property, and the network execution step may be performed such that the operation of deriving the extended triples conforms to a DBMS reasoning method when the input reasoning rule is classified as the case-based reasoning rule type.

The DBMS reasoning method may be performed to define data, generated during the operation of deriving the extended triples, as an α-memory view and a β-memory view and store the data in virtual memory.

The reasoning rule type classification step may be performed to classify the input reasoning rule as a structure-based reasoning rule type if all predicates of two or more pairs of conditions have structure properties when the two or more pairs of conditions are present in a condition part of the input reasoning rule, and the network execution step may be performed such that the operation of deriving the extended triples conforms to a memory reasoning method when the reasoning rule is classified as the structure-based reasoning rule type.

The reasoning rule type classification step may be performed to classify the input reasoning rule as a case-based reasoning rule type if at least one predicate of two or more pairs of conditions has a case property when the two or more pairs of conditions are present in a condition part of the input reasoning rule, and the network execution step may be performed such that the operation of deriving the extended triples conforms to a DBMS reasoning method when the reasoning rule is classified as the case-based reasoning rule type.

The network execution step may comprise a triple type classification step of classifying an input triple as one of one or more types; a triple table generation step of generating a table depending on the classified triple type; and a triple storage step of storing the classified triple in conjunction with the generated table.

The triple type classification step may be performed to classify the input triple as a resource triple type when a predicate of the input triple is rdf:type, and the triple table generation step may be performed to generate a table which has an object of the triple as a table name and has a 'subject' column, wherein a subject of the triple is allocated to a value of the table.

The triple type classification step may be performed to classify the input triple as an 'object property triple type' when a predicate of the input triple has an object property other than rdf:type, and the triple table generation step may be performed to generate a table which has the predicate of the triple as a table name and has 'subject' and 'object' columns.

The triple type classification step may be performed to classify the input triple as a data type property triple type when a predicate of the input triple has a data type property other than rdf:type, and the triple table generation step may be performed to generate a table which has the predicate of the triple as a table name and has 'subject', 'label', 'language' and 'datatype' columns, wherein only one of the 'language' and 'datatype' columns has a value and a remaining one is null.

By way of the above construction and flow, the system and method for hybrid Rete reasoning based on memory and DBMS according to the present invention perform efficient reasoning on large-capacity triples.

Advantageous Effects

As described above, the system and method for hybrid Rete reasoning based on memory and DBMS according to the present invention are very useful in that they perform efficient reasoning on large-capacity triples, thus ensuring the scalability of an ontology reasoning system which processes more than several billions of RDF triples, and improving the practical use of semantic web technology.

<Description of reference characters of important parts>

| | |
|---|---|
| 100: reasoning rule operation server | 110: reasoning rule input unit |
| 120: reasoning rule type classification unit | 130: Rete network generation unit |
| 140: Rete network execution unit | 200: triple storage server |
| 210: triple input unit | 220: triple type classification unit |
| 230: triple table generation unit | 240: triple storage unit |

BEST MODE

The terms and words used in the present specification and claims should not be interpreted as being limited to their typical meaning based on the dictionary definitions thereof, but should be interpreted to have the meaning and concept relevant to the technical spirit of the present invention, on the basis of the principle by which the inventor can suitably define the implications of terms in the way which best describes the invention.

Hereinafter, a system and method for hybrid Rete reasoning based on memory and DBMS according to the present invention will be described in detail with reference to the attached drawings.

Figure 1:
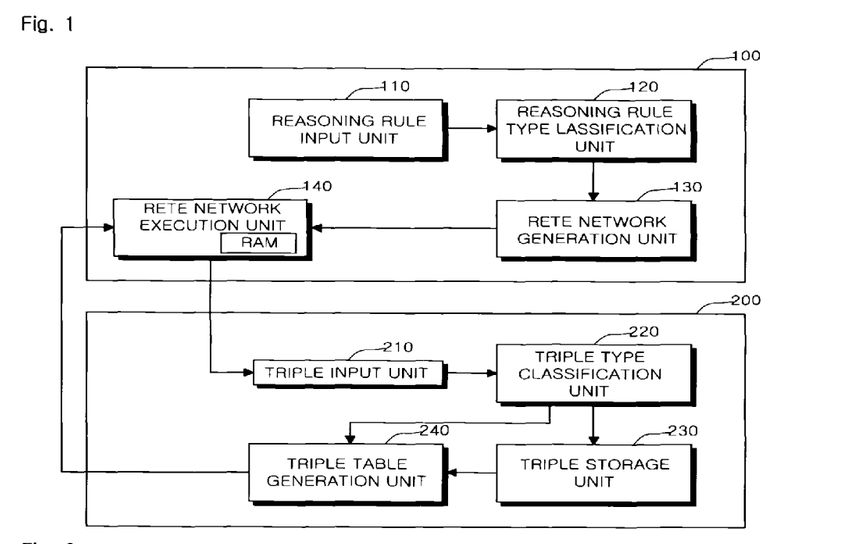
FIG. 1 is a block diagram showing the construction of a system for hybrid Rete reasoning based on memory and DBMS according to a first embodiment of the present invention.

FIG. 1 is a diagram showing the construction of a system for hybrid Rete reasoning based on memory and DBMS according to a first embodiment of the present invention. The system for hybrid Rete reasoning based on memory and DBMS according to the first embodiment of the present invention mainly includes a reasoning rule operation server 100 and a triple storage server 200.

First, the detailed construction of the reasoning rule operation server 100 is described below.

A reasoning rule input unit 110 analyzes an input reasoning rule and resolves the configuration of the input reasoning rule into a condition part and a conclusion part. That is, referring to FIG. 2, the left-hand sides of the illustrated reasoning rules (a), (b), (c) and (d) with respect to '->' are condition parts and the right-hand sides of the rules are conclusion parts.

Further, a reasoning rule type classification unit 120 classifies a relevant reasoning rule as a 'structure-based reasoning rule type' when the predicate of the condition part of the reasoning rule has a structure property, and as a 'case-based reasoning rule type' when the predicate has a case property.

Figure 2:
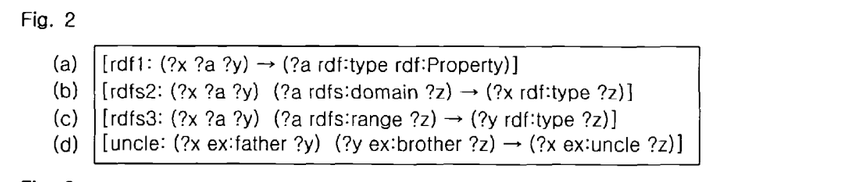
FIGS. 2 to 4 are diagrams illustrating a system for hybrid Rete reasoning based on memory and DBMS according to a first embodiment of the present invention.

That is, when the content inside parentheses in the condition parts of the reasoning rules (a), (b), (c) and (d) of FIG. 2 which have been referred to above, that is, each of {(?x ?a ?y), (?a rdfs:domain ?z), (?a rdfs:range ?z), (?x ex:father ?y), (?y ex:brother ?z)} is assumed to be (XX YY ZZ), a subject, a predicate, and an object correspond to 'XX', 'YY', and 'ZZ', respectively.

Here, when 'YY' corresponding to a predicate has a structure property {for example, (?x ?a ?y), (?a rdfs:domain ?z) and (?a rdfs:range ?z) of FIG. 2}, a relevant reasoning rule is classified as a 'structure-based reasoning rule type'. When 'YY' has a case property {for example, (?x ex:father ?y) and (?y ex:brother ?z) of FIG. 2}, a relevant reasoning rule is classified as a 'case-based reasoning rule type'.

A Rete network generation unit 130 generates a network depending on the classified reasoning rule type.

A Rete network execution unit 140 derives extended triples by applying a predetermined triple to the generated network.

Figure 5:
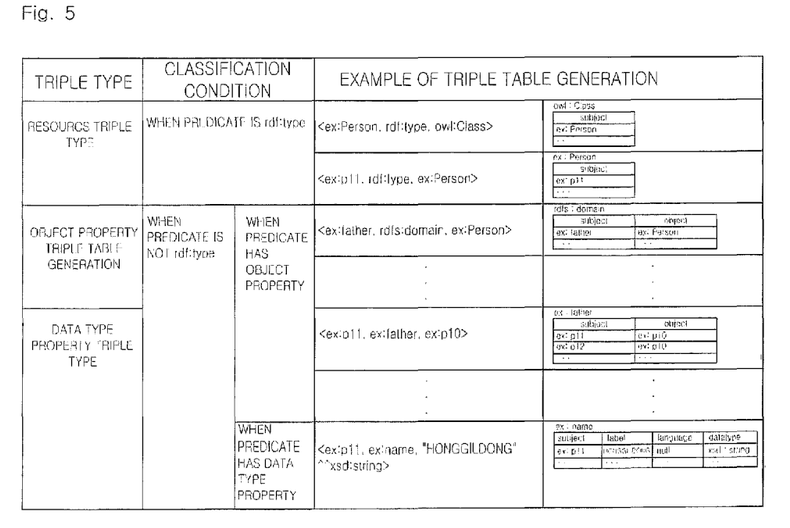
FIG. 5 is a diagram illustrating reasoning methods corresponding to the types of reasoning rules according to a first embodiment of the present invention.
Figure 6:
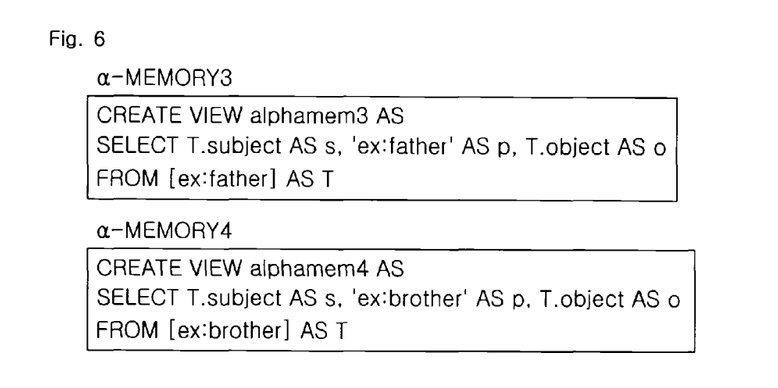
FIGS. 6 and 7 are diagrams illustrating an α-memory view and a β-memory view, respectively, defined in a first embodiment of the present invention.
Figure 7:
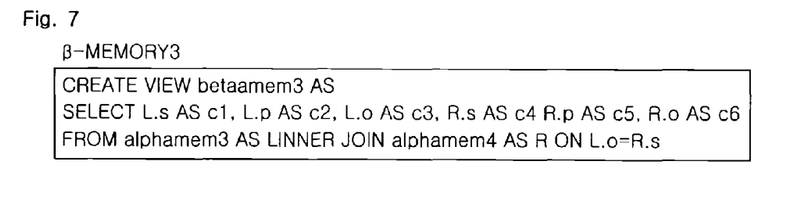

The operation of the Rete network execution unit 140 will be described in detail with reference to FIG. 5 illustrating reasoning methods corresponding to the types of reasoning rules, and FIGS. 6 and 7 illustrating an α-memory view and a β-memory view, respectively.

The Rete network execution unit 140 derives extended triples by applying a predetermined triple to the generated network. In particular, the Rete network execution unit 140 conforms to a 'memory reasoning method' of storing triples, that is, α-memory0, α-memory1, and α-memory2 of FIG. 4, which match patterns, such as three reasoning rules (?x ?a ?y), (?a rdfs:domain ?z) and (?a rdfs:range ?z) classified as a 'structure-based reasoning rule type' and illustrated in FIG. 2, in physical memory (for example, Random Access Memory [RAM].

Figure 4:
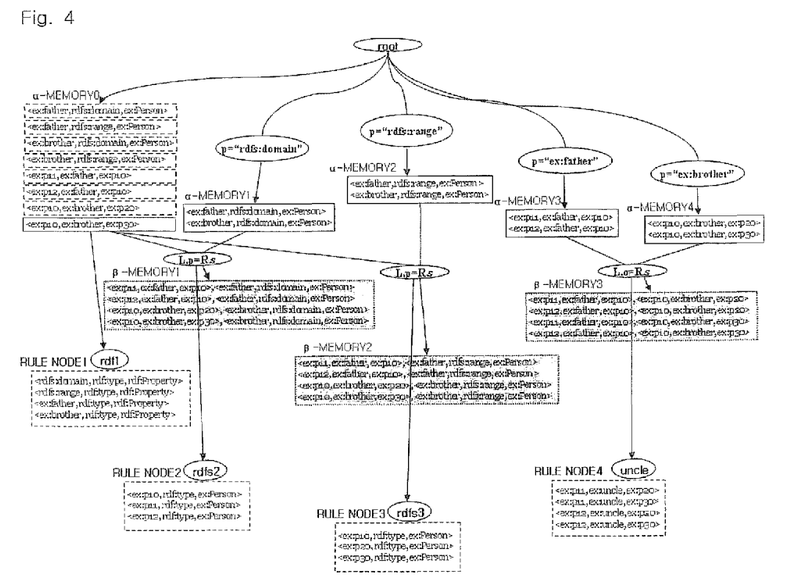

For reference, in the α-memory0 of FIG. 4, since triples are sequentially input in a direction from top to bottom, triples indicated by a dotted box are previously input triples, and a triple indicated by a solid box is an input triple currently being input. The α-memory0 is described in detail below.

Especially, in the case of a pattern, such as (?x, ?a, ?y) capable of matching all triples, since the predicate is a variable (?a), it is impossible to determine whether the predicate has a structure property or a case property. Accordingly, because a plurality of triples matches this pattern (almost all input triples match this pattern), it is general to classify a reasoning rule such as the pattern as a 'case-based reasoning rule type', define α-memory corresponding to this rule type as an α-memory view, and conform to a DBMS reasoning method. However, due to the characteristics of reasoning rules, there is no need to retain all triples matching the pattern, but only the final input triple needs to be retained, and thus the reasoning rule is classified as a 'structure-based reasoning rule type', and the final input triple is stored in RAM according to a memory reasoning method.

Unlike this method, the Rete network execution unit 140 conforms to a 'DBMS reasoning method' of defining triples, that is, α-memory3 and α-memory4 of FIG. 4, which match patterns such as the two reasoning rules (?x ex:father ?y) and (?y ex:brother ?z) classified as a 'case-based reasoning rule type' and illustrated in FIG. 2, as respective α-memory views, as shown in FIG. 6, and of storing the triples in virtual memory.

For reference, when two or more pairs of conditions (subject, predicate, object) are present in a single reasoning rule {the cases of (b), (c) and (d) of FIG. 2}, the Rete network execution unit 140 also selectively applies the 'memory reasoning method' and the 'DBMS reasoning method' to portions (for example, β-memory of FIG. 4) in which the respective conditions are sequentially combined with each other, thus deriving extended triples.

That is, when all conditions participating in the combination correspond to the 'memory reasoning method' {the cases of (b) and (c) of FIG. 2}, all combined conditions (β-memory1 and β-memory2 of FIG. 4) are also stored in physical memory (for example, RAM) according to the 'memory reasoning method'. When any one of the participating conditions corresponds to the 'DBMS reasoning method' {the case of (d) of FIG. 2}, all combined conditions (β-memory 3 of FIG. 4) are also defined as β-memory views, as shown in FIG. 7, and are also stored in virtual memory according to the 'DBMS reasoning method'.

Further, the detailed construction of the triple storage server 200 in the system for hybrid Rete reasoning based on memory and DBMS according to the first embodiment of the present invention will be described below.

A triple input unit 210 receives an input RDF triple through an ontology input device, such as an ontology management system or an ontology collector. In this case, the formats of the RDF triple may include all ontology formats, such as RDF/Extensible Markup Language (XML), N-Triples, and Turtle. Further, the triple input unit 210 performs an ontology analysis procedure for recognizing each RDF triple on the basis of the format of the input RDF triple.

A triple type classification unit 220 classifies the input triple as one of one or more types.

Figure 3:
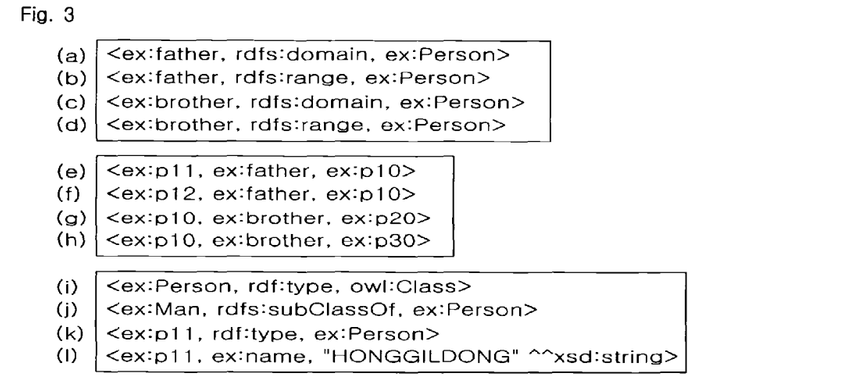

That is, when each of the triples (a) to (l) of FIG. 3 which have been referred to above is assumed to be <AA, BB, CC>, a 'subject', a 'predicate', and an 'object' correspond to 'AA', 'BB' and 'CC', respectively.

Here, if 'BB' corresponding to a predicate is 'rdf:type', the input triple is classified as a 'resource triple type' {for example, (i) and (k) of FIG. 3}, if 'BB' has an object property other than 'rdf:type', the triple is classified as an 'object property triple type' {for example, (a) to (h) and (j) of FIG. 3}, and if 'BB' has a data type property other than 'rdf:type', the triple is classified as a 'data type property triple type' {for example, (l) of FIG. 3}.

Figure 8:
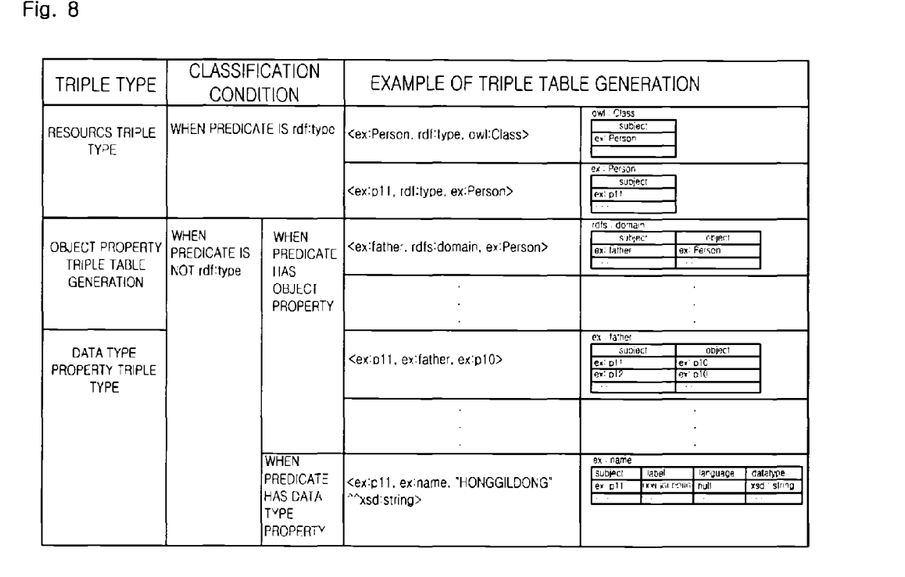
FIG. 8 is a diagram showing an example of the principle of the generation of triple tables corresponding to the types of triples according to a first embodiment of the present invention.

A triple table generation unit 230 generates a table depending on the classified triple type. This operation is described in detail below with reference to FIG. 8 illustrating the principle of the generation of triple tables corresponding to triple types.

That is, in the case of a triple <AA, BB, CC> classified as a 'resource triple type', the triple table generation unit 230 generates a table which has an object corresponding to 'CC' as a table name and has a 'subject' column, wherein a subject corresponding to 'AA' is entered as the value of the subject column.

Further, in the case of a triple <AA, BB, CC> classified as an 'object property triple type', the triple table generation unit 230 generates a table which has a predicate corresponding to 'BB' as a table name and has 'subject' and 'object' columns.

Finally, in the case of a triple <AA, BB, CC> classified as a 'data type property triple type', the triple table generation unit 230 generates a table which has a predicate corresponding to 'BB' as a table name and has 'subject', 'label', 'language', and 'datatype' columns. Here, only one of the 'language' and 'datatype' columns has a value and the remaining one is null.

A triple storage unit 240 stores the classified triple in conjunction with the generated table, and the Rete network execution unit 140 derives extended triples by applying the triple stored in the triple storage unit 240 to the network generated depending on the type of reasoning rule.

Figure 9:
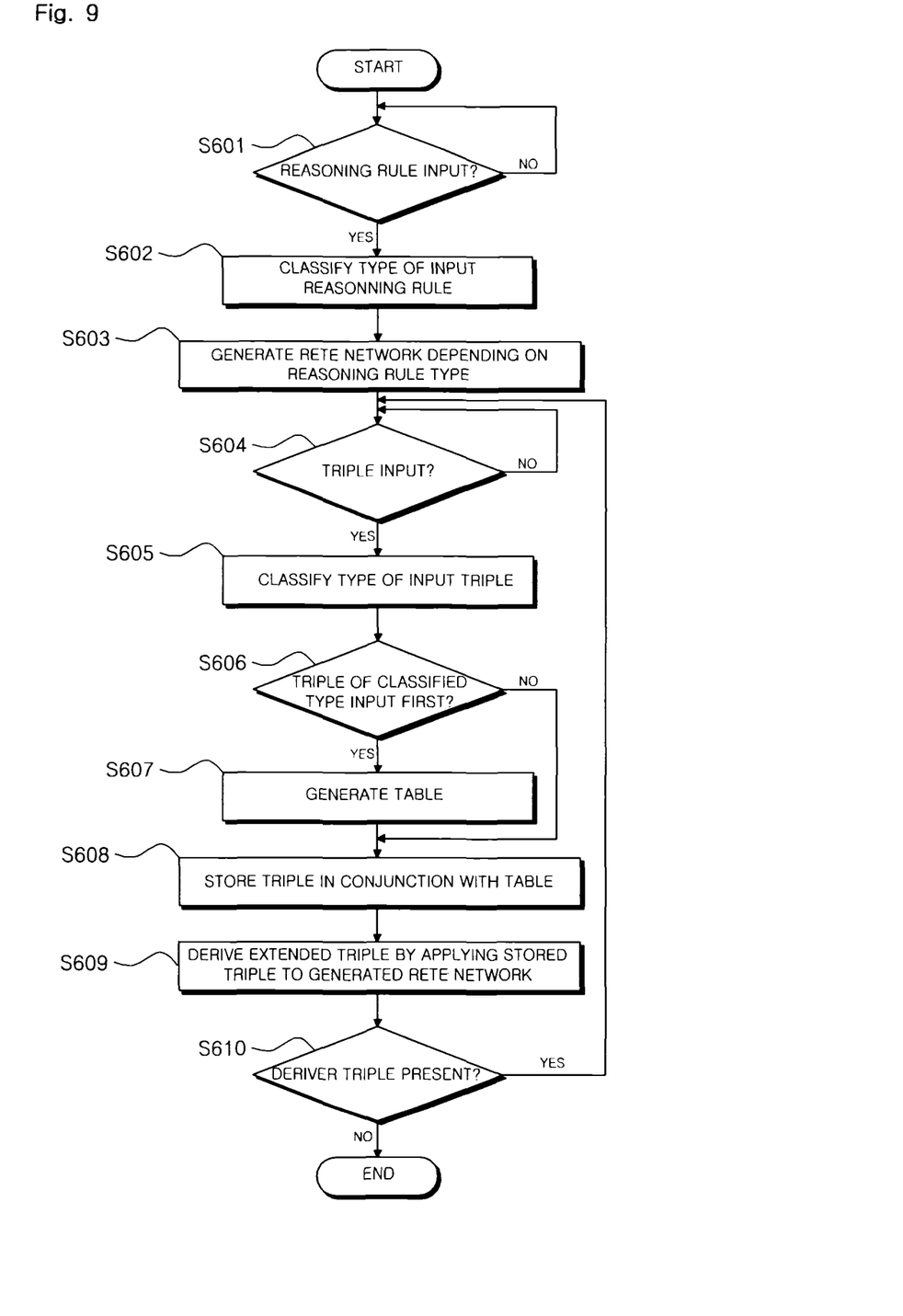
FIG. 9 is a flowchart showing a method for hybrid Rete reasoning based on memory and DBMS according to a first embodiment of the present invention.

FIG. 9 is a flowchart showing a method for hybrid Rete reasoning based on memory and DBMS according to a first embodiment of the present invention. Hereinafter, the operation of the system for hybrid Rete reasoning based on memory and DBMS having the above construction will be described in detail.

First, when a reasoning rule is input ("Yes" at step S601), the reasoning rule input unit 110 of the reasoning rule operation server 100 analyzes the input reasoning rule and resolves the configuration of the rule into a condition part and a conclusion part. The left-hand sides of the reasoning rules (a), (b), (c) and (d), illustrated in FIG. 2, with respect to '->' are condition parts, and the right-hand sides are conclusion parts.

Next, the reasoning rule type classification unit 120 classifies the type of the input reasoning rule at step S602. At this time, when the predicate of the condition part of the reasoning rule has a structure property, the reasoning rule is classified as a 'structure-based reasoning rule type'. When the predicate has a case property, the reasoning rule is classified as a 'case-based reasoning rule type'.

That is, when content inside parentheses in the condition parts of the reasoning rules (a), (b), (c) and (d) of FIG. 2 which have been referred to above, that is, each of {(?x ?a ?y), (?a rdfs:domain ?z), (?a rdfs:range ?z), (?x ex:father ?y), (?y ex:brother ?z)} is assumed to be (XX YY ZZ), a 'subject', a 'predicate' and an 'object' correspond to 'XX', 'YY' and 'ZZ', respectively. Here, when 'YY' corresponding to a predicate has a structure property, the reasoning rule is classified as a 'structure-based reasoning rule type', and when 'YY' has a case property, the reasoning rule is classified as a 'case-based reasoning rule type'.

Further, the Rete network generation unit 130 generates a network depending on the classified reasoning rule type at step S603.

In this state, when an RDF triple is input through an ontology input device, such as an ontology management system or an ontology collector ("Yes" at step S604), the triple input unit 210 performs an ontology analysis procedure for recognizing each RDF triple on the basis of the format of the input RDF triple.

Thereafter, the triple type classification unit 220 classifies the input triple as one of one or more types at step S605.

That is, when each of the triples (a)~(l) which have been referred to above is assumed to be <AA, BB, CC>, a 'subject', a 'predicate' and an 'object' correspond to 'AA', 'BB', and 'CC', respectively. In this case, if 'BB' corresponding to a predicate is 'rdf:type', the triple is classified as a 'resource triple type' {for example, (i) and (k) of FIG. 3}, if 'BB' has an object property other than 'rdf:type', the triple is classified as an 'object property triple type' {for example, (a) to (h) and (j) of FIG. 3}, and if 'BB' has a data type property other than 'rdf:type', the triple is classified as a 'data type property triple type' {for example, (l) of FIG. 3}.

Next, when a triple of the classified type is input first ("Yes" at step S606), the triple table generation unit 230 generates a table depending on the input triple type at step S607.

That is, in the case of a triple <AA, BB, CC> classified as a 'resource triple type', the triple table generation unit 230 generates a table which has an object corresponding to 'CC' as a table name and has a 'subject' column, wherein a subject corresponding to 'AA' is entered as the value of the subject column. Further, in the case of a triple <AA, BB, CC> classified as an 'object property triple type', the triple table generation unit 230 generates a table which has a predicate corresponding to 'BB' as a table name and has 'subject' and 'object' columns. Finally, in the case of a triple <AA, BB, CC> classified as a 'data type property triple type', the triple table generation unit 230 generates a table which has the predicate corresponding to 'BB' as a table name and has 'subject', 'label', 'language', and 'datatype' columns. Here, only one of the 'language' and 'datatype' columns has a value and the remaining one is null (refer to FIG. 8).

Thereafter, the triple storage unit 240 stores the classified triple in conjunction with the generated table at step S608.

Next, the Rete network execution unit 140 derives extended triples by applying the triple stored in the triple storage unit 240 to the Rete network generated depending on the type of reasoning rule at step S609.

The Rete network execution unit 140 derives the extended triples by applying a predetermined triple to the generated network. In particular, the Rete network execution unit 140 conforms to a 'memory reasoning method' of storing triples, that is, α-memory0, α-memory1, and α-memory2 of FIG. 4, which match patterns, such as the three reasoning rules (?x ?a ?y), (?a rdfs:domain ?z) and (?a rdfs:range ?z) classified as a 'structure-based reasoning rule type' and illustrated in FIG. 2, in physical memory (for example, RAM).

Unlike this method, the Rete network execution unit 140 conforms to a 'DBMS reasoning method' of defining triples, that is, α-memory3 and α-memory4 of FIG. 4, which match patterns, such as the two reasoning rules (?x ex:father ?y) and (?y ex:brother ?z) classified as a 'case-based reasoning rule type' and illustrated in FIG. 2, as respective a-memory views, as shown in FIG. 6, and of storing the triples in virtual memory.

For reference, when two or more pairs of conditions (subject, predicate, object) are present in a single reasoning rule {the cases of (b), (c) and (d) of FIG. 2}, the Rete network execution unit 140 also selectively applies the 'memory reasoning method' and the 'DBMS reasoning method' to portions (for example, β-memory of FIG. 4) in which the respective conditions are sequentially combined with each other, thus deriving extended triples. That is, when all conditions participating in the combination correspond to the 'memory reasoning method' {the cases of (b) and (c) of FIG. 2}, all combined conditions (β-memory1 and β-memory2 of FIG. 4) are also stored in the physical memory (for example, RAM) according to the 'memory reasoning method'. When any one of the participating conditions corresponds to the 'DBMS reasoning method' {the case of (d) of FIG. 2}, all combined conditions (β-memory 3 of FIG. 4) are also defined as β-memory views, as shown in FIG. 7, and are also stored in the virtual memory according to the 'DBMS reasoning method'.

Further, when there is a triple derived through the above process ("Yes" at step S610), the Rete network execution unit 140 returns to the triple input operation at step S604, whereas when there is no derived triple ("No" at step S610), the process is terminated.

Although the preferred embodiments of the present invention have been described in detail, those skilled in the art will appreciate that various modifications and changes are possible within the scope and spirit of the present invention. It is apparent that these modifications and changes belong to the accompanying claims.

MODE FOR INVENTION

Industrial Applicability

The present invention relates to a system and method for hybrid Rete reasoning based on memory and DBMS, which can perform efficient reasoning on large-capacity RDF triples by enabling a memory reasoning method and a DBMS reasoning method to be selectively applied depending on the types of reasoning rules at the time of performing reasoning on RDF triples. The present invention is a very useful invention, which ensures the scalability of an ontology reasoning system for processing more than several billions of RDF triples, and improves the practical use of semantic web technology.

The invention claimed is:

1. A system for hybrid Rete reasoning based on memory and Database Management System (DBMS), comprising:
    reasoning rule type classification means for classifying an input reasoning rule as one of one or more types;
    network generation means for generating a network depending on the classified reasoning rule type; and
    network execution means for deriving extended triples by applying a predetermined triple to the generated network,
    wherein the extended triples are derived by applying the predetermined triple to Rete network depending on the classified reasoning rule type,
    wherein the reasoning rule type classification means classifies the input reasoning rule as a structure-based reasoning rule type when a predicate of a condition part of the input reasoning rule has a structure property, and the network execution means is configured such that an operation of deriving the extended triples conforms to a memory reasoning method when the reasoning rule is classified as the structure-based reasoning rule type, and
    wherein the reasoning rule type classification means classifies the input reasoning rule as a case-based reasoning rule type when a predicate of a condition part of the input reasoning rule has a case property, and the network execution means is configured such that the operation of deriving the extended triples conforms to a DBMS reasoning method when the reasoning rule is classified as the case-based reasoning rule type.

2. The system according to claim 1, wherein the memory reasoning method is configured to store data, generated during the operation of deriving the extended triples, in physical memory.

3. The system according to claim 2, wherein the network execution means is configured such that, when the reasoning rule is (?x, ?a, ?y), the operation of deriving the extended triples conforms to the memory reasoning method.

4. The system according to claim 2, wherein:
    the reasoning rule type classification means classifies the input reasoning rule as a case-based reasoning rule type when a predicate of a condition part of the input reasoning rule has a case property, and
    the network execution means is configured such that the operation of deriving the extended triples conforms to a DBMS reasoning method when the reasoning rule is classified as the case-based reasoning rule type.

5. The system according to claim 4, wherein the DBMS reasoning method is configured to define data, generated during the operation of deriving the extended triples, as an .alpha.-memory view and a .beta.-memory view and store the data in virtual memory.

6. The system according to claim 2, wherein:
    the reasoning rule type classification means classifies the input reasoning rule as a structure-based reasoning rule type if all predicates of two or more pairs of conditions have structure properties when the two or more pairs of conditions are present in a condition part of the input reasoning rule, and
    the network execution means is configured such that the operation of deriving the extended triples conforms to a memory reasoning method when the reasoning rule is classified as the structure-based reasoning rule type.

7. The system according to claim 2, wherein:
    the reasoning rule type classification means classifies the input reasoning rule as a case-based reasoning rule type if at least one predicate of two or more pairs of conditions has a case property when the two or more pairs of conditions are present in a condition part of the input reasoning rule, and the network execution means is configured such that the operation of deriving the extended triples conforms to a DBMS reasoning method when the reasoning rule is classified as the case-based reasoning rule type.

8. The system according to claim 1, wherein the network execution means is configured such that, when the reasoning rule is (?x, ?a, ?y), the operation of deriving the extended triples conforms to the memory reasoning method.

9. The system according to claim 1, wherein the DBMS reasoning method is configured to define data, generated during the operation of deriving the extended triples, as an .alpha.-memory view and a .beta.-memory view and store the data in virtual memory.

10. The system according to claim 1,
wherein: the reasoning rule type classification means classifies the input reasoning rule as a structure-based reasoning rule type if all predicates of two or more pairs of conditions have structure properties when the two or more pairs of conditions are present in a condition part of the input reasoning rule, and the network execution means is configured such that the operation of deriving the extended triples conforms to a memory reasoning method when the reasoning rule is classified as the structure-based reasoning rule type.

11. The system according to claim 1, wherein:
the reasoning rule type classification means classifies the input reasoning rule as a case-based reasoning rule type if at least one predicate of two or more pairs of conditions has a case property when the two or more pairs of conditions are present in a condition part of the input reasoning rule, and the network execution means is configured such that the operation of deriving the extended triples conforms to a DBMS reasoning method when the reasoning rule is classified as the case-based reasoning rule type.

12. The system according to claim 1, wherein the network execution means is configured such that, when the reasoning rule is (?x, ?a, ?y), the operation of deriving the extended triples conforms to the memory reasoning method.

13. The system according to claim 1, wherein:
the reasoning rule type classification means classifies the input reasoning rule as a case-based reasoning rule type when a predicate of a condition part of the input reasoning rule has a case property, and
the network execution means is configured such that the operation of deriving the extended triples conforms to a DBMS reasoning method when the reasoning rule is classified as the case-based reasoning rule type.

14. The system according to claim 13, wherein the DBMS reasoning method is configured to define data, generated during the operation of deriving the extended triples, as an .alpha.-memory view and a .beta.-memory view and store the data in virtual memory.

15. The system according to claim 1, wherein:
the reasoning rule type classification means classifies the input reasoning rule as a structure-based reasoning rule type if all predicates of two or more pairs of conditions have structure properties when the two or more pairs of conditions are present in a condition part of the input reasoning rule, and
the network execution means is configured such that the operation of deriving the extended triples conforms to a memory reasoning method when the reasoning rule is classified as the structure-based reasoning rule type.

16. The system according to claim 1, wherein: the reasoning rule type classification means classifies the input reasoning rule as a case-based reasoning rule type if at least one predicate of two or more pairs of conditions has a case property when the two or more pairs of conditions are present in a condition part of the input reasoning rule, and the network execution means is configured such that the operation of deriving the extended triples conforms to a DBMS reasoning method when the reasoning rule is classified as the case-based reasoning rule type.

17. A method for hybrid Rete reasoning based on memory and Database Management System (DBMS), comprising:
a reasoning rule type classification step of classifying an input reasoning rule as one of one or more types;
a network generation step of generating a network depending on the classified reasoning rule type; and
a network execution step of deriving extended triples by applying a predetermined triple to the generated network,
wherein the extended triples are derived by applying the predetermined triple to Rete network depending on the classified reasoning rule type,
wherein the reasoning rule type classification means classifies the input reasoning rule as a structure-based reasoning rule type when a predicate of a condition part of the input reasoning rule has a structure property, and the network execution means is configured such that an operation of deriving the extended triples conforms to a memory reasoning method when the reasoning rule is classified as the structure-based reasoning rule type, and
wherein the reasoning rule type classification means classifies the input reasoning rule as a case-based reasoning rule type when a predicate of a condition part of the input reasoning rule has a case property, and the network execution means is configured such that the operation of deriving the extended triples conforms to a DBMS reasoning method when the reasoning rule is classified as the case-based reasoning rule type.

18. The method according to claim 17, wherein the memory reasoning method is performed to store data generated during the operation of deriving the extended triples in physical memory.

19. The method according to claim 18, wherein the network execution step is performed such that, when the reasoning rule is (?x, ?a, ?y), the operation of deriving the extended triples conforms to the memory reasoning method.

20. The method according to claim 18, wherein:
the reasoning rule type classification step is performed to classify the input reasoning rule as a case-based reasoning rule type when a predicate of a condition part of the input reasoning rule has a case property, and
the network execution step is performed such that the operation of deriving the extended triples conforms to a DBMS reasoning method when the input reasoning rule is classified as the case-based reasoning rule type.

21. The method according to claim 20, wherein the DBMS reasoning method is performed to define data, generated during the operation of deriving the extended triples, as an .alpha.-memory view and a .beta.-memory view and store the data in virtual memory.

22. The method according to claim 18, wherein:
the reasoning rule type classification step is performed to classify the input reasoning rule as a structure-based reasoning rule type if all predicates of two or more pairs of conditions have structure properties when the two or more pairs of conditions are present in a condition part of the input reasoning rule, and the network execution step is performed such that the operation of deriving the extended triples conforms to a memory reasoning method when the reasoning rule is classified as the structure-based reasoning rule type.

23. The method according to claim 18, wherein:
the reasoning rule type classification step is performed to classify the input reasoning rule as a case-based reasoning rule type if at least one predicate of two or more pairs of conditions has a case property when the two or more pairs of conditions are present in a condition part of the input reasoning rule, and
the network execution step is performed such that the operation of deriving the extended triples conforms to a DBMS reasoning method when the reasoning rule is classified as the case-based reasoning rule type.

24. The method according to claim 17, wherein the DBMS reasoning method is performed to define data, generated during the operation of deriving the extended triples, as an .alpha.-memory view and a .beta.-memory view and store the data in virtual memory.

25. The method according to claim 17, wherein:
the reasoning rule type classification step is performed to classify the input reasoning rule as a structure-based reasoning rule type if all predicates of two or more pairs of conditions have structure properties when the two or more pairs of conditions are present in a condition part of the input reasoning rule, and the network execution step is performed such that the operation of deriving the extended triples conforms to a memory reasoning method when the reasoning rule is classified as the structure-based reasoning rule type.

26. The method according to claim 17, wherein:
the reasoning rule type classification step is performed to classify the input reasoning rule as a case-based reasoning rule type if at least one predicate of two or more pairs of conditions has a case property when the two or more pairs of conditions are present in a condition part of the input reasoning rule, and
the network execution step is performed such that the operation of deriving the extended triples conforms to a DBMS reasoning method when the reasoning rule is classified as the case-based reasoning rule type.

27. The method according to claim 2, wherein:
the reasoning rule type classification step is performed to classify the input reasoning rule as a case-based reasoning rule type when a predicate of a condition part of the input reasoning rule has a case property, and
the network execution step is performed such that the operation of deriving the extended triples conforms to a DBMS reasoning method when the input reasoning rule is classified as the case-based reasoning rule type.

28. The method according to claim 27, wherein the DBMS reasoning method is performed to define data, generated during the operation of deriving the extended triples, as an .alpha.-memory view and a .beta.-memory view and store the data in virtual memory.

29. The method according to claim 17, wherein:
the reasoning rule type classification step is performed to classify the input reasoning rule as a structure-based reasoning rule type if all predicates of two or more pairs of conditions have structure properties when the two or more pairs of conditions are present in a condition part of the input reasoning rule, and
the network execution step is performed such that the operation of deriving the extended triples conforms to a memory reasoning method when the reasoning rule is classified as the structure-based reasoning rule type.

30. The method according to claim 17, wherein: the reasoning rule type classification step is performed to classify the input reasoning rule as a case-based reasoning rule type if at least one predicate of two or more pairs of conditions has a case property when the two or more pairs of conditions are present in a condition part of the input reasoning rule, and the network execution step is performed such that the operation of deriving the extended triples conforms to a DBMS reasoning method when the reasoning rule is classified as the case-based reasoning rule type.

* * * * *